2,755,623
Patented Dec. 25, 1956

2,775,623

ISOLATION OF ETHYLENE GLYCOL FROM A MIXTURE ALSO CONTAINING PROPYLENE GLYCOL

John Barr Bell, Jr., Locust, N. J., assignor to Jefferson Chemical Company, Inc., New York, N. Y., a corporation of Delaware No Drawing. Application October 20, 1953,
Serial No. 387,300

7 Claims. (Cl. 260—637)

This invention relates to the isolation of ethylene glycol from mixtures of ethylene glycol with propylene glycol-1,2.

The production of ethylene glycol, for example, by chlorohydrinating crude ethylene to produce ethylene chlorohydrin, heating the chlorohydrin with an alkali to produce ethylene oxide and hydrating the oxide commonly results in the production of ethylene glycol containing a substantial proportion of propylene glycol-1,2, derived from the propylene present in the crude ethylene stream subjected to chlorohydrination. In many cases, it has not been found economical to effect complete removal of propylene from the crude ethylene stream subjected to chlorohydrination, nor is it feasible to effect the substantially complete separation of ethylene glycol from propylene glycol-1,2 by distillation because of the small difference between their boiling points.

It is an object of this invention to provide a simple and efficient process for isolating ethylene glycol from a mixture of it with propylene glycol-1,2.

Other objects and advantages of this invention will be apparent from the following detailed description thereof.

In accordance with this invention a mixture of ethylene glycol and propylene glycol-1,2 is heated in the presence of a dehydration catalyst at a temperature such that the water formed during the course of the reaction is driven off. Surprisingly it has been found that the propylene glycol-1,2 is converted to propionaldehyde and 2,6-dimethyl-1,4-dioxane while no substantial decomposition of the ethylene glycol takes place as long as propylene glycol remains in the reaction mixture and as long as a maximum still pot temperature of about 160° C. is not exceeded. The propionaldehyde and the 2,6-dimethyl-1,4-dioxane are driven off from the reaction mixture along with the water formed in the reaction, leaving an ethylene glycol catalyst mixture from which the ethylene glycol can readily be recovered, for example, by removing the catalyst and, if desired, purifying the ethylene glycol, for example, by a simple distillation.

Ethylene glycol may be recovered from any available mixture of it with propylene glycol-1,2. The mixture may contain from a trace of propylene glycol-1,2 up to as much as 50% by weight.

Any known catalyst capable of catalyzing the dehydration of propylene glycol-1,2 may be employed in practicing this invention. Examples of such catalysts are: sulfuric acid, phosphoric acid, pyrophosphoric acid, sodium bisulfate and aromatic and aliphatic sulfonic acids, such as benzene sulfonic acid, methane sulfonic acid and ethane sulfonic acid. Sulfuric acid is the preferred catalyst. Desirably, a concentrated catalyst is employed, for example, sulfuric acid of about 96% concentration. However, a dilute catalyst solution may be used, the diluent, e. g., water being driven off before or during the course of the reaction. The amount of catalyst employed is not critical. From ½% to 20%, preferably from 1% to 10%, by weight of catalyst based on the weight of total glycol present in the reaction mixture may be used.

Preferably the reaction is carried out by mixing the mixture of glycols with the catalyst and heating the reaction mixture under atmospheric pressure to a temperature of 140° to 160° C., preferably 150° to 160° C. At this temperature the water formed in the reaction, as well as any water which may have been introduced into the reaction mixture with the catalyst, is driven off. The propionaldehyde is driven off along with the water. Also the 2,6-dimethyl-1,4-dioxane is driven off as a binary azeotrope with the water. The propionaldehyde and 2,6-dimethyl-1,4 dioxane may be recovered in any suitable manner from the condensate obtained by condensing the vapors taken off overhead during the course of the reaction. Heating of the reaction mixture is continued until all of the propylene glycol-1,2 has been decomposed. This will be evidenced by a sharp reduction in the volume of overhead products. If heating is continued and the still pot temperature permitted to rise to about 180° C., the ethylene glycol will react to produce 1,4-dioxane. The presence of 1,4-dioxane in the overhead products is readily detected because when 1,4-dioxane comes off overhead the condensate no longer forms two phases (a water phase and an oil phase, consisting chiefly of dimethyldioxane which is not completely miscible with water) but a single phase of 1,4-dioxane and water which are miscible. Accordingly as soon as a trace of 1,4-dioxane is observed the heating of the reaction mixture is discontinued, leaving a reaction mixture consisting of ethylene glycol, catalyst and non-volatile decomposition products chiefly glycol sulfuric acid compounds when sulfuric acid is employed as the catalyst.

Obviously the duration of heating will vary depending upon the charge of mixed glycols subjected to dehydration and the catalyst and equipment used. As above indicated the dehydration reaction is preferably carried out under atmospheric pressure conditions.

The reaction mixture is treated to recover the ethylene glycol therefrom. For example, it may be neutralized with a base, such as sodium hydroxide, and the ethylene glycol recovered by distillation. Still another method is to dilute the reaction mixture with water and pass the diluted mixture through a resin of the anion adsorption type, such as the resin obtained by the condensation of organic amines or similar basic materials with formaldehyde known as "Anex" and believed to be a melamine resin or the resinous product of condensation of aromatic amines, such as aniline with formaldehyde known as "Amberlite 1R–4" disclosed in United States Patent 2,409,441 of October 15, 1946. This resin treatment effects the removal of free and combined acid. The thus deacidified solution is then concentrated and distilled to recover the ethyene glycol. Still another method is to neutralize the reaction mixture with aqueous alkali to produce a dilute solution, concentrate this solution and filter or centrifuge it to remove the salt formed during the neutralization. The filtrate may be used as such as the desired ethylene glycol product or subjected to a distillation treatment before use.

If desired, a diluent such as a hydrocarbon inert to the catalyst and the glycols under reaction conditions may be added to the reaction mixture subjected to dehydration. The addition of such diluent, it has been found, affects the relative proportions of propionaldehyde and 2,6-dimethyl-1,4 dioxane formed during the course of the dehydration reaction. Thus, if the reaction mixture subjected to dehydration is rendered more dilute by the addition of an inert hydrocarbon, such, for example, as tetradecane, an increase takes place in the amount of propionaldehyde relative to the amount of dimethyldioxane formed during the course of the reaction. Generally, the greater the amount of diluent present, i. e., the more dilute the glycol mixture is relative to its content of propylene glycol-1,2, the greater the proportion of propionaldehyde and the smaller the proportion of 2,6-dimethyl-1,4-dioxane produced. Under the preferred reaction condition ethylene glycol acts as such an inert diluent.

The following example is illustrative of the process of this invention. It will be understood the invention is not limited to this example.

4 parts of sulfuric acid of 96% concentration is added to 96 parts of glycol mixture consisting of 90% ethylene glycol and 10% propylene glycol-1,2 and the resultant mixture heated to 150° to 160° C. The propylene glycol is converted almost quantitatively to a mixture which analyzes 75% propionaldehyde and 25% 2,6-dimethyl-1,4-dioxane and which is taken off overhead along with water, forming a two-phase distillate. The reaction is continued until 1,4-dioxane is identified in the overhead product to assure that all of the propylene glycol has been converted; this takes place when the still pot temperature reaches about 180° C. and is indicated by the formation of a one-phase distillate. The heating is then interrupted and the reaction mixture neutralized with sodium hydroxide and distilled. 74% of the ethylene glycol in the mixture subjected to dehydration is thus recovered. Substantially higher recoveries of ethylene glycol are obtained by destroying the dehydration catalyst before stripping the 2,6-dimethyl-1,4-dioxane from the system thereby minimizing dehydration of the ethylene glycol.

Since certain changes may be made in carrying out the above process without departing from the scope of the invention, it is intended that all matter contained in the above description shall be interpreted as illustrative and not in a limiting sense.

What is claimed is:

1. The process of isolating ethylene glycol from a mixture of it with propylene glycol-1,2, which comprises, heating the mixture in the presence of an acid dehydration catalyst capable of catalyzing the dehydration of propylene glycol-1,2 at a temperature not exceeding about 160° C. but sufficient to drive off from the reaction mixture the water, propionaldehyde and 2,6-dimethyl-1,4-dioxane formed during the course of the reaction, discontinuing the heating when substantially all of the propylene glycol-1,2 has been decomposed, and removing ethylene glycol from the resultant reaction mixture.

2. The process of isolating ethylene glycol from a mixture of it with propylene glycol-1,2 as defined in claim 1, in which a diluent inert to the glycols and the dehydration catalyst is incorporated in the reaction mixture thereby increasing the proportion of propionaldehyde to 2,6-dimethyl-1,4-dioxane formed in the dehydration reaction.

3. The process of isolating ethylene glycol from a mixture of it with propylene glycol-1,2, which comprises, heating the mixture in the presence of sulfuric acid dehydration catalyst at a temperature not exceeding about 160° C. but sufficient to drive off from the reaction mixture the water, propionaldehyde and 2,6-dimethyl-1,4-dioxane formed during the course of the reaction, discontinuing the heating when substantially all of the propylene glycol-1,2 has been decomposed, and removing ethylene glycol from the resultant reaction mixture.

4. The process of isolating ethylene glycol from a mixture of it with propylene glycol-1,2, which comprises, heating the mixture in the presence of an acid dehydration catalyst capable of catalyzing the dehydration of propylene glycol-1,2 to a temperature of 140° to 160° C., continuing said heating to a temperature of 140° to 160° C. until propylene glycol-1,2 is substantially completely decomposed and the water, propionaldehyde and 2,6-dimethyl-1,4-dioxane are removed from the reaction mixture, thereafter discontinuing the aforesaid heating and recovering the ethylene glycol from the residual reaction mixture.

5. The process of isolating ethylene glycol from a mixture of it with propylene glycol-1,2, which comprises, heating the mixture in the presence of a sulfuric acid dehydration catalyst to a temperature of 140° to 160° C., continuing said heating to a temperature of 140° to 160° C. until propylene glycol-1,2 is substantially completely decomposed and the water, propionaldehyde and 2,6-dimethyl-1,4-dioxane are removed from the reaction mixture, thereafter discontinuing the aforesaid heating and recovering the ethylene glycol from the residual reaction mixture.

6. The process of isolating ethylene glycol from a mixture of it with propylene glycol-1,2, which comprises, heating the mixture in the presence of an acid dehydration catalyst capable of catalyzing the dehydration of propylene glycol-1,2 to a temperature of 140° to 160° C. until substantially all of the propylene glycol-1,2 is decomposed and the water, propionaldehyde and 2,6-dimethyl-1,4-dioxane is removed from the reaction mixture, thereafter discontinuing the aforesaid heating, neutralizing the residual reaction mixture and recovering ethylene glycol therefrom.

7. The process of isolating ethylene glycol from a mixture of it with propylene glycol-1,2, which comprises, heating the mixture in the presence of from ½% to 20% concentrated sulfuric acid based on the total weight of glycols to a temperature of from 140° to 160° C. until substantially all of the propylene glycol-1,2 is decomposed and the water, propionaldehyde and 2,6-dimethyl-1,4-dioxane is removed from the reaction mixture, thereafter discontinuing the aforesaid heating, neutralizing the residual reaction mixture and recovering the ethylene glycol therefrom.

References Cited in the file of this patent

UNITED STATES PATENTS

| 1,423,042 | Steffens | July 18, 1922 |
| 1,939,189 | Steimmig et al. | Dec. 12, 1933 |
| 2,249,986 | Smith | July 22, 1941 |
| 2,501,042 | Gear | Mar. 21, 1950 |

OTHER REFERENCES

Berkman et al.: Catalysis, 1940, page 658.